United States Patent
Lim et al.

(10) Patent No.: US 10,719,918 B2
(45) Date of Patent: Jul. 21, 2020

(54) DYNAMICALLY DETERMINING FILTERING STRENGTH FOR NOISE FILTERING IN IMAGE PROCESSING

(71) Applicant: Apple Inc., Cupertino, CA (US)

(72) Inventors: Suk Hwan Lim, Mountain View, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/389,785

(22) Filed: Apr. 19, 2019

(65) Prior Publication Data
US 2019/0244330 A1    Aug. 8, 2019

Related U.S. Application Data

(63) Continuation of application No. 14/841,384, filed on Aug. 31, 2015, now Pat. No. 10,269,095.

(51) Int. Cl.
| | |
|---|---|
| H04N 5/225 | (2006.01) |
| G06T 5/00 | (2006.01) |
| G06T 1/20 | (2006.01) |
| H04N 5/217 | (2011.01) |
| G06T 7/41 | (2017.01) |
| H04N 9/04 | (2006.01) |

(52) U.S. Cl.
CPC .............. *G06T 5/002* (2013.01); *G06T 1/20* (2013.01); *G06T 7/41* (2017.01); *H04N 5/217* (2013.01); *G06T 2207/10024* (2013.01); *G06T 2207/20012* (2013.01); *H04N 9/045* (2013.01)

(58) Field of Classification Search
CPC ................................ H04N 9/045; G06T 5/002
USPC ......................................................... 348/241
See application file for complete search history.

(56) References Cited

U.S. PATENT DOCUMENTS

| | | | |
|---|---|---|---|
| 8,055,075 B1 | 11/2011 | Tamura | |
| 8,351,739 B2 | 1/2013 | Lee et al. | |
| 8,942,477 B2 | 1/2015 | Tamura et al. | |
| 2009/0185058 A1* | 7/2009 | Vakrat | H04N 5/357 348/241 |
| 2010/0157150 A1 | 6/2010 | Ahn et al. | |
| 2013/0321672 A1 | 12/2013 | Silverstein et al. | |
| 2013/0322753 A1 | 12/2013 | Lim et al. | |
| 2015/0030258 A1* | 1/2015 | Chen | G06T 5/002 382/266 |

FOREIGN PATENT DOCUMENTS

WO      2015084966      6/2015

\* cited by examiner

*Primary Examiner* — Usman A Khan
(74) *Attorney, Agent, or Firm* — Robert C. Kowert; Kowert, Hood, Munyon, Rankin & Goetzel, P.C.

(57) ABSTRACT

An image processing pipeline may dynamically determine filtering strengths for noise filtering of image data. Statistics may be collected for an image at an image processing pipeline. The statistics may be accessed and evaluated to generate a filter strength model that maps respective filtering strengths to different portions of the image. A noise filter may determine a filtering strength for image data received at the noise filter according to the filter strength model. The noise filter may then apply a filtering technique according to the determined filtering strength.

20 Claims, 7 Drawing Sheets

DYNAMICALLY DETERMINING FILTERING STRENGTH FOR NOISE FILTERING IN IMAGE PROCESSING

This application is a continuation of U.S. patent application Ser. No. 14/841,384, filed Aug. 31, 2015, which is hereby incorporated by reference herein in its entirety.

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera or other image sensor capable of capturing image data may, in some embodiments, be configured to dynamically determine filtering strength for applying a noise filtering technique. Noise statistics may be collected for an image and stored to a memory. An image processing controller may access the statistics and generate a filter strength model that maps filtering strengths to different portions of the image. A noise filter at the image signal processor may access the filter strength model to determine a filter strength for received image data. The noise filter may then filter the image data according to the determined filter strength.

Figure 1:
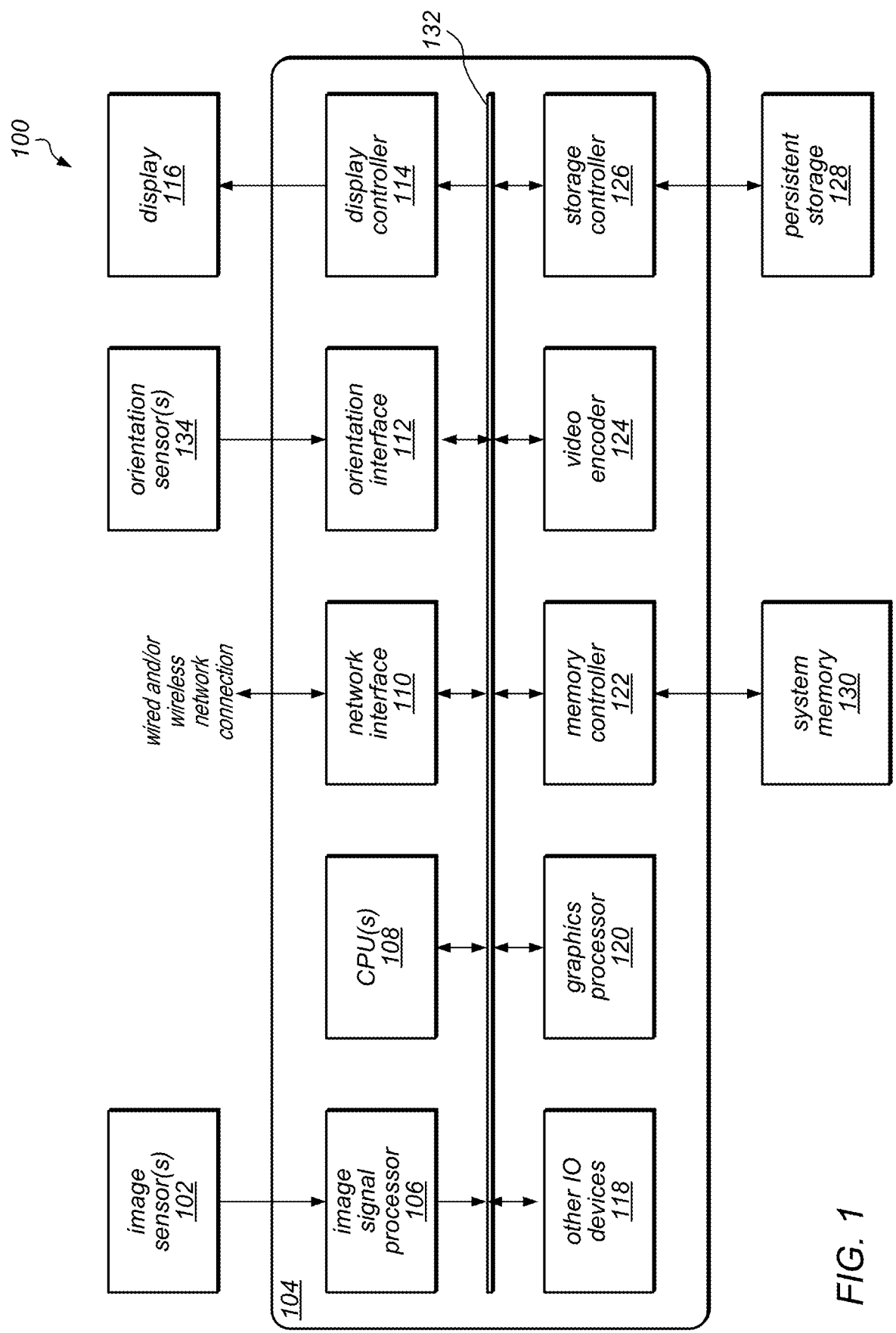
FIG. 1 is a logical block diagram illustrating an example system that may implement an image processing pipeline that performs noise filtering on image data according to dynamically determined filtering strengths, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques or components to correct or enhance image data captured by an image sensor. Many of the image processing stages in the image processing pipeline may perform better when noise characteristics for the image are known. For example, in a noise filter, a noise standard deviation table may be utilized so that a proper amount of filtering is applied to different regions of an image. Other image processing stages, such as stages that demosaic raw image data or sharpening image data may utilize the noise statistics.

In various embodiments, the image signal processor may dynamically generate noise statistics for an image in order to perform enhanced performance of image processing techniques, such as noise filtering, according to information determined from the noise statistics. Noise statistics may be collected for different portions of an image. The statistics may be stored in a memory that is accessible to a controller or other component that may access and analyze the noise statistics. In the case of noise filtering, a filter strength model may be generated based on the noise statistics which maps filtering strengths to different portions of an image. When a noise filter receives image data for filtering, a filter strength may be determined according to the filter strength model. Noise filtering may then be applied to the image data at the determined filter strength. In this way, particular portions of an image may be targeted for particular strengths of filter. Portions of an image with high texture content may have reduced filtering strength applied, whereas smooth or low texture content portions of the image may have increased filter strength applied. Having dynamically determined filtering strengths may allow for a noise filter to apply adaptive filtering dependent on image content (or other factors that may impact noise such as environmental changes like temperature changes).

The techniques described herein for dynamically determining filtering strengths for noise processing of image data may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., DRAM) 130, persistent storage (e.g., flash memory) 128, and a display 116 (e.g., LCD or OLED). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors or several processing cores (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, ARM™, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
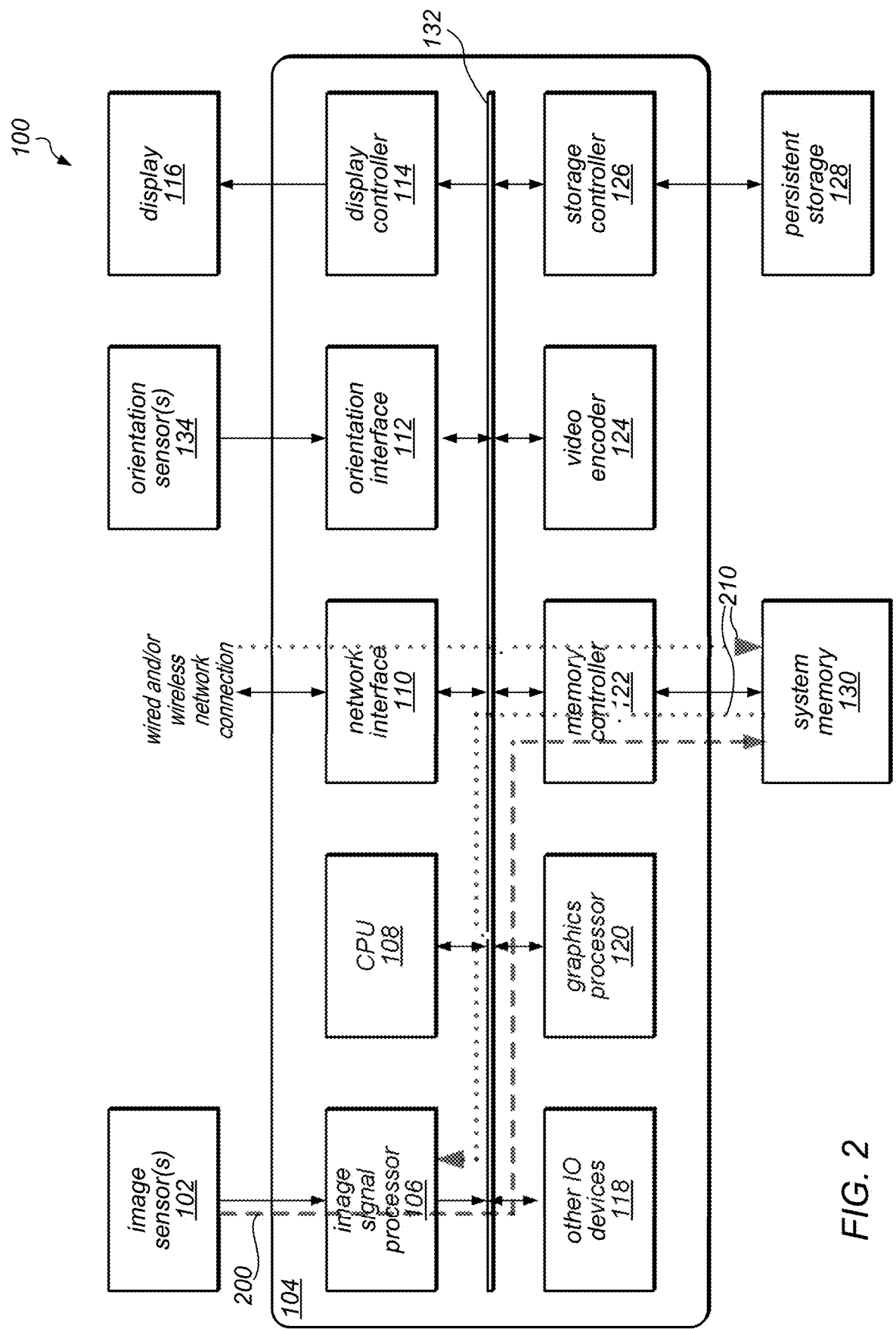
FIG. 2 is a logical block diagram illustrating example data paths in a system that may implement an image processing pipeline that performs noise filtering on image data according to dynamically determined filtering strengths, according to some embodiments.

FIG. 2 is a block diagram illustrating data paths in a system that implements an image signal processor (specifically, in system 100 illustrated in FIG. 1), according to some embodiments. As illustrated by the dashed lines in one example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received by system 100 from sources other than the image sensor(s) 102. For example, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130.

Figure 3:
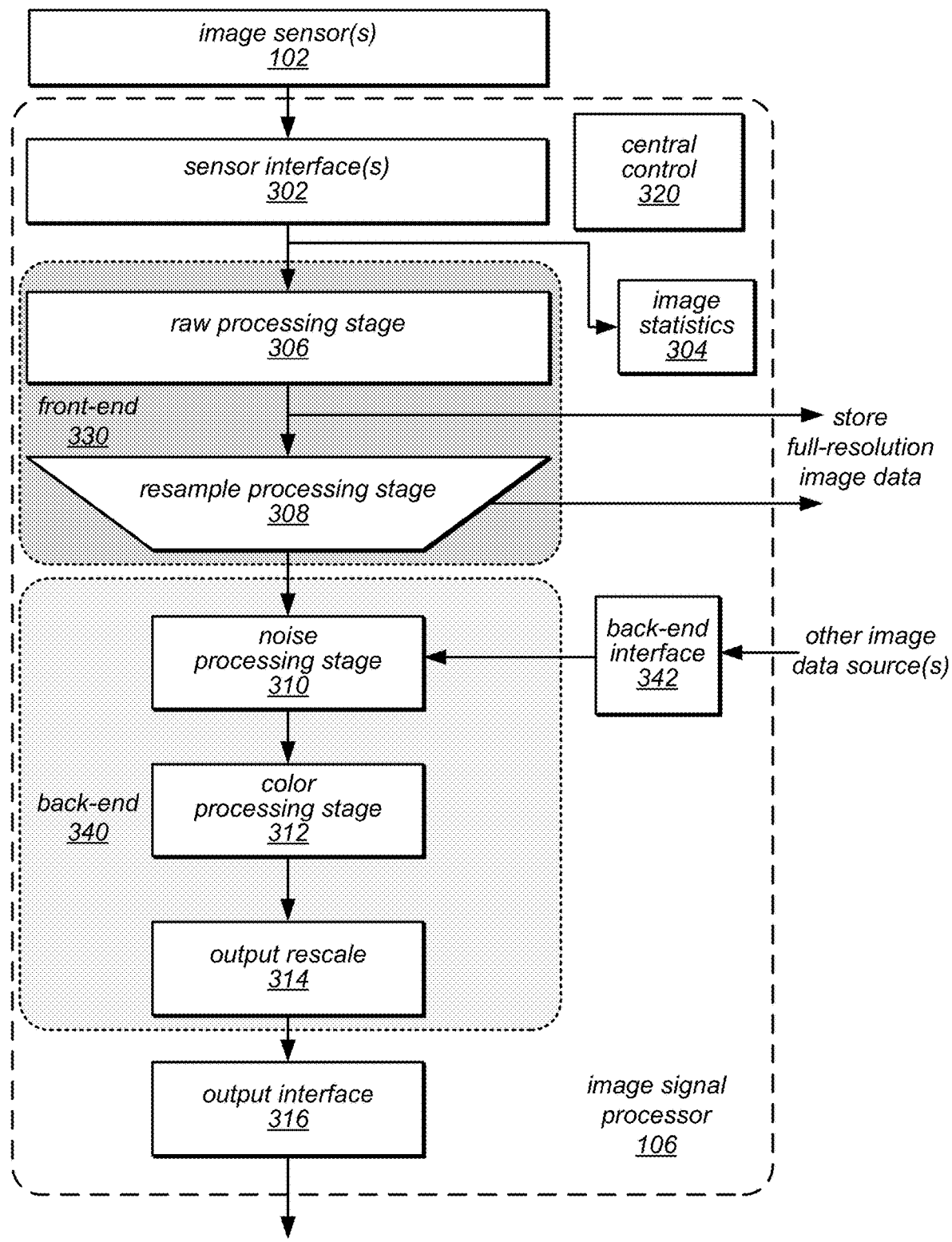
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, or output rescale 314), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations, such as pixel defect correction to detect and correct patterned defects and defect line pairs (e.g., created by special pixels like focus pixels), and image cropping or binning to reduce image data size. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the example embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle, then raw processing stage 306 operations like black level compensation, highlight recovery, defective pixel correction, and others, may process 2 pixels of image data at a time.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages. For instance, back-end interface 342 may convert RGB, YCbCr 4:2:0, or YCbCr 4:2:2 formatted image data into YCbCr 4:4:4 color format. Please note that back-end interface 342 may convert from various color formats, and thus the previous examples are not intended to be limiting.

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw or full-color domain format may be stored in addition to or instead of processing the image data output from resample processing stage 308 through backend pipeline stages.

In various embodiments, image signal processor 106 may implement image statistics module(s) 304. Image statistics module(s) 304 may perform various functions and collect information. For example image statistics module may, in some embodiments perform sensor linearization, defective pixel replacement, black level compensation, lens shading correction, and inverse black level compensation in order to collect image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, certain pixels' values, or areas of pixel values may be excluded from statistics collections, such as from AF statistics, when the statistics operations like sensor linearization, defective pixel replacement, black level compensation, lens shading correction, and inverse black level compensation identify clipped pixels. In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306 and resample processing stage 308, which may process image data in raw or full-color domains. Raw processing stage 306 may, in various embodiments implement a variety of modules, units, or components to perform various operations, functions, or tasks on raw image data. Bayer raw format, for example, may be image data collected from image sensor(s) 102 that implement a Bayer pattern of pixel sensors. For instance, some pixel sensors only capture green light, while other pixel sensors capture red or blue light in Bayer pattern of pixels. In this way, image data in Bayer raw image format (or other raw image format captured by a color filter array in an image sensor) provides pixel data with values specific to a particular color (instead of all colors).

Raw processing stage 306 may thus process image data in a raw format (such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a companding format collected from a High Dynamic Range (HDR) image sensor which may be one of image sensor(s) 102). Black level compensation may, in some embodiments, be performed to provide digital gain, offset and clip independently for each color component (e.g., Gr,R,B,Gb) on the pixels' image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr,R,B,Gb in Bayer format). Please note that various examples and descriptions provided above are not intended to be limiting as to the various techniques, components, or formats of raw processing stage 306 but are instead merely provided as examples. Various components, units, or modules may be broken apart into multiple different pipeline processing stages. Also note that in some embodiments, various ones of the components, units, or modules may convert raw image data into full-color domain, and thus raw processing stage 306 may, at various portions, process image data in the full-color domain in addition to or instead of raw image data. For instance, a simple demosaic unit may receive data from raw noise filtering and interpolate a full-color domain for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, or scale image data received from raw processing stage 306, and may provide as output image data accordingly at a reduced rate such as may be processed by a back-end pipeline stages 340. Please note, that in some embodiments, some or all of the portions of resample processing stage may be implemented as part of raw processing stage and thus the previous description is provided as an example pipeline stages in an image processing pipeline which may implement multi-rate processing for image data.

In various embodiments, image signal processor 106 may implement one or more back-end pipeline stages 340 to process image data at rate that is less than the initial rate for processing image data in front-end stages 330 (e.g., 4 ppc initial rate >3, 2, or 1 ppc reduced rate). In at least some embodiments, back-end pipeline stages 340 may process image data according to a particular full-color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full-color format (or may utilize different full-color formats for processing), and thus the previous example is not intended to be limiting.

Image signal processor 106 may implement noise processing stage 310, in some embodiments. Noise processing stage 310 may, in various embodiments implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RBG to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values. For instance, a temporal filter may filter Y color channel values (from image data in YCbCr format) with Y color channel values in the reference frame (without filtering on other channels like Cb or Cr).

Other noise filtering, such as spatial noise filtering may be performed, such as discussed in further detail below with regard to FIG. 4. In at least some embodiments, luma sharpening and chroma suppression may be performed to as part of spatial noise filtering in simultaneous or near simultaneous fashion. Luma sharpening may sharpen luma values of pixel data, in some embodiments. Chroma suppression may attenuate chroma to gray (i.e. no color), in some embodiments. The aggressiveness of noise filtering may be determined dynamically so that noise filtering may be performed differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-7) may be implemented in various combinations of hardware or software.

As noted above, spatial noise filtering may be performed as part of noise processing stage 310 and may filter image data at different strengths in different parts of an image. Instead of relying upon statically defined noise characteristics for a sensor to determine filtering strengths, filtering strengths may be determined dynamically according to noise profiles and other statistics collected for an image. FIG. 4 is a logical block diagram illustrating a noise filter that filters image data according to dynamically determined filtering strengths, according to some embodiments. Noise filter unit 400 may apply various spatial filtering techniques to remove noise from image data 402 at spatial noise filter 420 and provide noise filtered image data 404. Noise filter unit 400 may also implement noise statistics collection unit 410 to collect statistics for estimating noise based on image data 402. In this way, a filter strength model 460 can be updated according to noise statistics 440 determined for an image so that filtering strength can be dynamically programmed and applied at spatial noise filter 420.

Noise statistics collection unit 410 may be implemented to provide statistics and other information as part of noise statistics 440 that are calculated for an image to determine locations in the image where noise can be best estimated. In various embodiments, the collected statistics may be calculated over various groups of pixels (e.g., pixel blocks) within an image to determine these locations. For example, portions of an image that include a flat surface are good candidates for use in noise estimation. Locating these portions of an image may allow for filtering strength decisions to be determined dynamically based on the content of an image. Noise statistics collection unit 410 may store noise statistics 440 in system memory 130 so that ISP controller 450 (e.g., a firmware controller) can identify such portions of the image for estimating noise.

Figure 6:
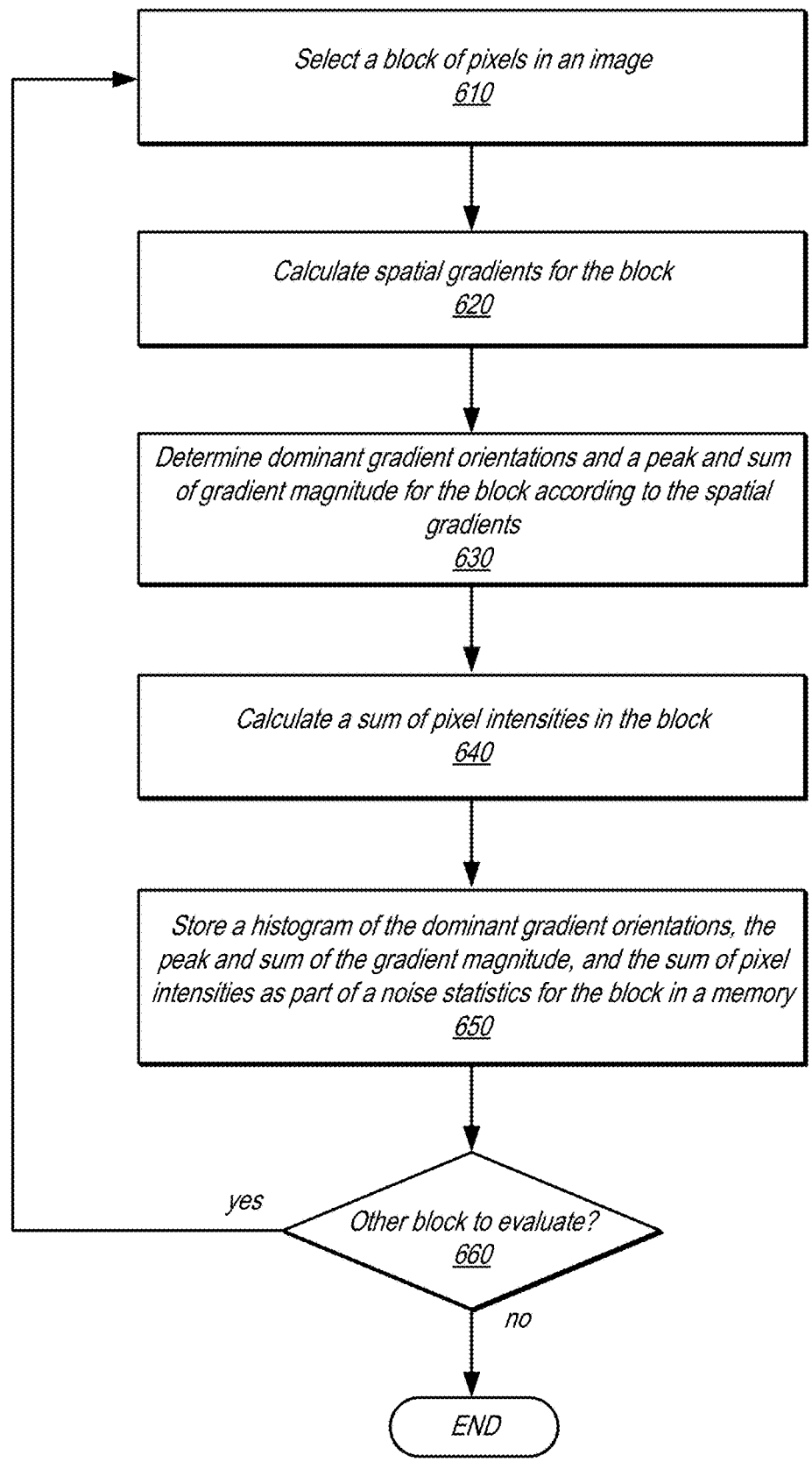
FIG. 6 is a high-level flowchart illustrating various methods and techniques for generating noise statistics for an image, according to some embodiments.

Noise statistics collection unit 410 may collect and generate noise statistics 440 in different ways. For example, noise statistics collection unit 410 may compute a histogram that counts the dominant gradient orientations for local non-overlapping blocks in an image. Additionally, a peak and a sum of the gradient magnitudes may be computed for the blocks. Noise statistics collection unit 410 may calculate color saturation or hue angles for blocks (although in some embodiments other statistics collection units may collect color statistics, such as different units within image statistics stage 304). To generate some of these statistics, noise statistics collection unit 410 may utilize spatial support 432 from line buffer(s) 430 (which may be shared with spatial noise filter 420). FIG. 6, discussed below, provides examples of techniques noise statistics collection unit 410 may implement to collect noise statistics 440.

In at least some embodiments, an ISP controller 450, may access noise statistics 440 collected and generated by noise statistics collection unit 410 and determine various filtering strengths to be mapped to different portions of the image. For example, ISP controller 450 may identify portions of the image that have gradient orientations with isotropic distribution and peak gradient magnitudes that are small. Noise estimations may be calculated based on the statistics generated for the pixel blocks in order to provide a noise profile or other information that may be used to determine the filtering strength to be applied to portions of an image. For example, in some embodiments, statistics may be evaluated to determine signal variances within an image to determine the amount of texture compared to noise standard deviation in the image (e.g., by computing a standard deviation gain map based on the ratios of magnitude of gradient to noise standard deviation and magnitude of gradient to peak gradient). ISP controller 450 may then identify portions of the image that have low signal variations (e.g., bright areas of a standard deviation gain map) and increase the filtering strength to be applied, whereas areas with high signal variations (e.g., such as dark areas of the standard deviation gain amp) may have decreased filtering strength applied. Other collected noise statistics 440 may be used to program filter strength model 460 (e.g., such as color saturation or hue angles) that may be used to target particular hues of an image for more or less filtering. ISP controller 450 may access system memory 130 to program a filter strength model 460 according to the noise statistics 440 to indicate the filtering strength to be applied to different portions of an image. In this way, spatial noise filter 420 can access filter strength model 460 to apply noise filtering to portions of an image according to filtering strengths determined dynamically. In some embodiments, filter strength model 460 may be stored as a two-dimensional lookup table that maps gain values representing filtering strength to be applied when filtering at spatial noise filter 420. The two-dimensional lookup table may also be programmed to apply radial gain to account for other image processing performed (such as lens shading correction).

Spatial noise filter 420 may apply different spatial filtering techniques to remove noise from received image data 402. As noted earlier, spatial noise filter 420 may utilize the same spatial support 432 provided by line buffer(s) 430 that is utilized by noise statistics collection unit 410. Spatial noise filter 420 may be programmed or directed to perform different filtering techniques or modes. Some filtering techniques may be applied to particular color channels, such as luminance values (for image data encoded in YCC). For instance, in at least some embodiments, spatial noise filter 420 may perform simplified bilateral filtering or non-local (NL)-means filtering on luminance image data. For chrominance image data, spatial noise filter 420 may implement a multi-stage spatial noise filter, first applying a bilateral noise filter, a vertical infinite impulse response (IIR) filter, and a horizontal filter. As discussed below with regard to FIG. 7, a standard deviation may be determined for applying filtering techniques to image data 402. The standard deviation may then be modified according to a filtering strength determined from filter strength model 460 that corresponds to a portion of the image being filter at spatial noise filter 420. The standard deviation may be utilized to determine whether or not image data is noise and should be filtered.

Figure 4:
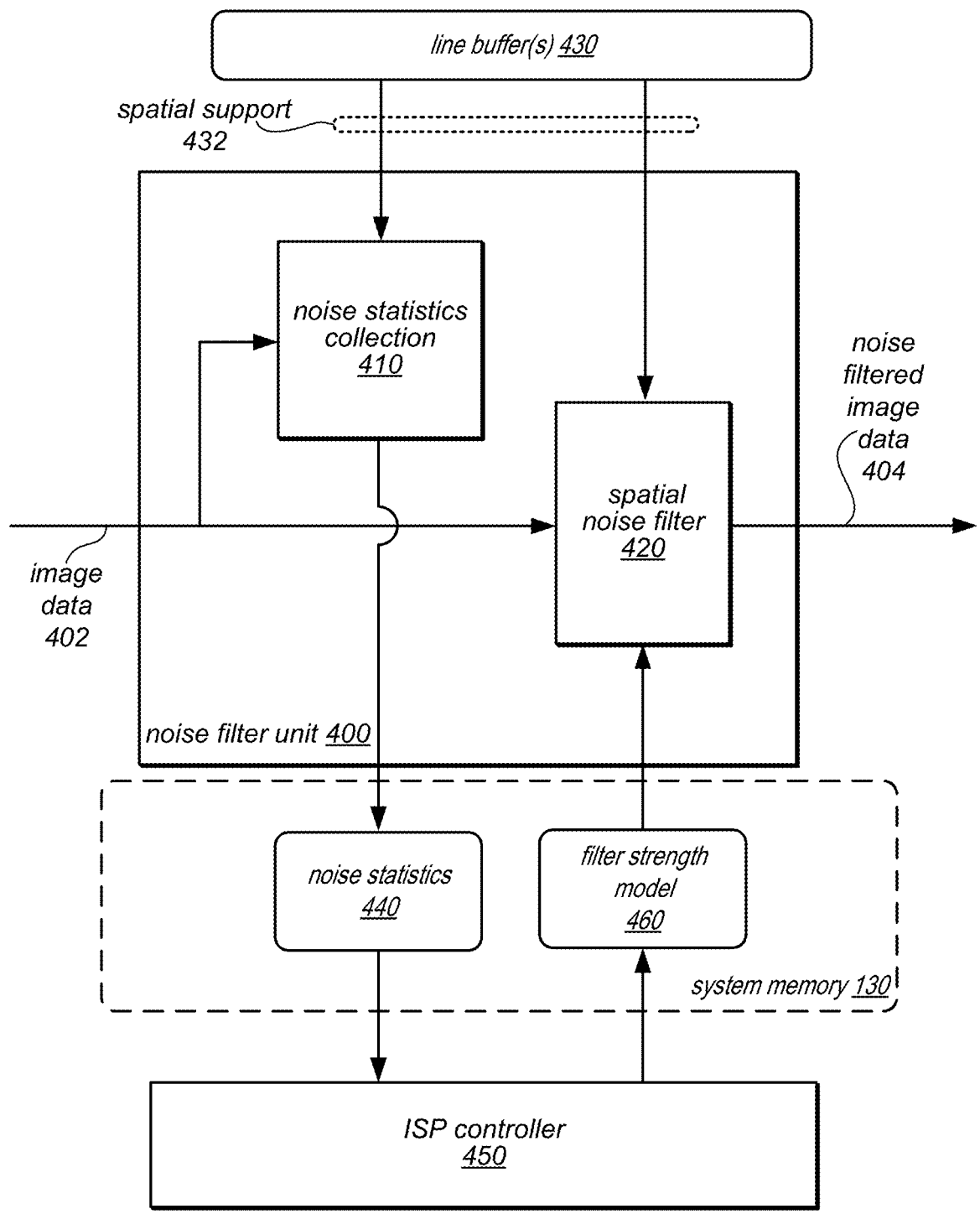
FIG. 4 is a logical block diagram illustrating a noise filter that filters image data according to dynamically determined filtering strengths, according to some embodiments.

FIG. 4 is provided as merely an example of a noise filter 400. Different combinations of the illustrated components (as well as components not illustrated) may be used to perform noise filtering according to a filter strength model programmed from collected noise statistics. For example, in some embodiments, spatial noise filter 420 may be implemented as multiple different filtering components for different portions of image data (e.g., for different channels). Thus, the components of FIG. 4 and their respective layout or ordering is not intended to be limiting to the various other combinations which may be used to noise filter 400.

Figure 5:
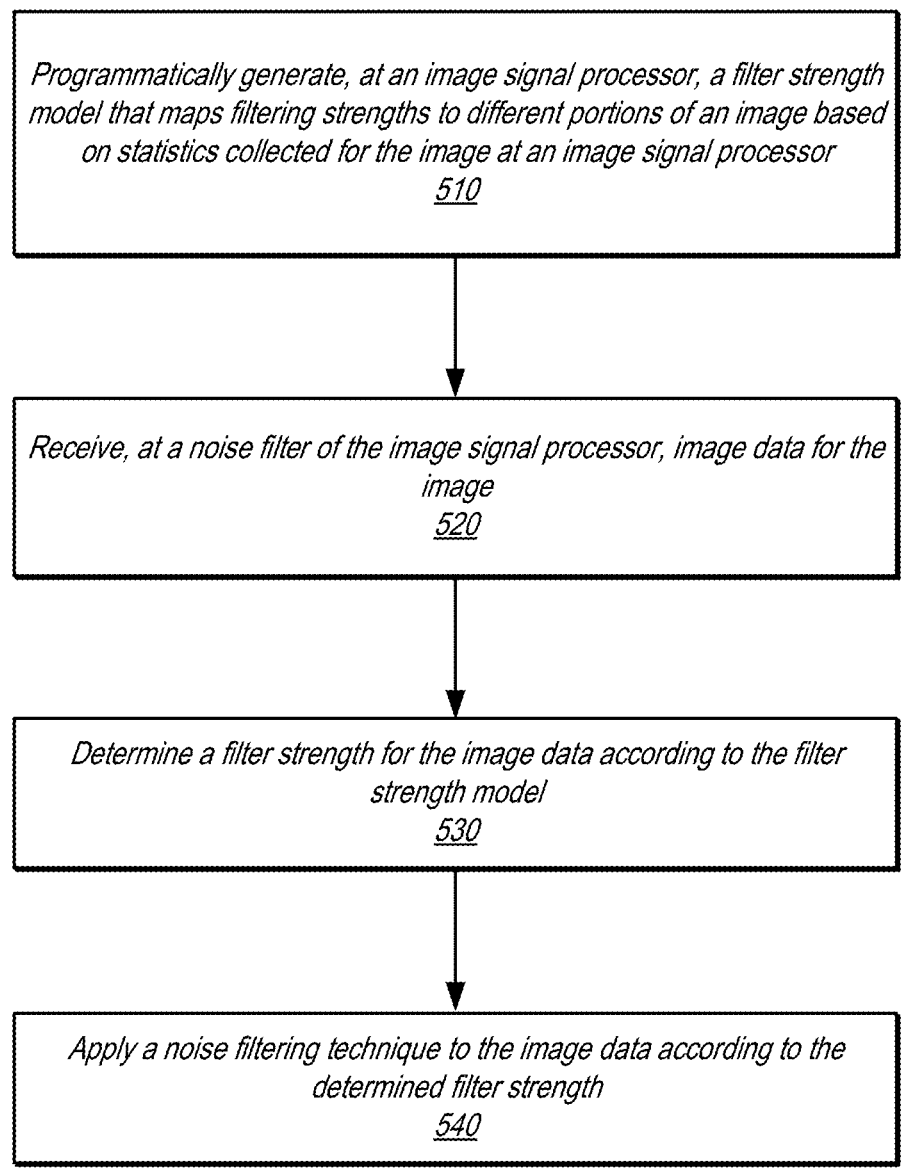
FIG. 5 is a high-level flowchart illustrating various methods and techniques for performing noise filtering on image data according to dynamically determined filtering strengths, according to some embodiments.

FIGS. 1-4 provide an example of an image processing pipeline, image signal processor, and system which may implement multi-rate processing for image data in an image processing pipeline. However, numerous other types or configurations of systems or devices that implement an image processing pipeline and image signal processor may perform multi-rate processing for image data. FIG. 5 is a high-level flowchart illustrating various methods and techniques for performing noise filtering on image data according to dynamically determined filtering strengths, according to some embodiments. The various components described above may implement these techniques (in addition to those described with regard to FIGS. 6-7 below) as well as various other image processing pipelines and image signal processors.

As indicated at 510, a filter strength model that maps filtering strengths to different portions of an image may be programmatically generated based on statistics collected for the image at an image signal processor. Statistics may include noise statistics collected for the image across different groups or blocks of pixels to calculate different statistics for the pixels within a block. For example, noise statistics may be collected and generated which identify a dominant gradient orientation and a peak and a sum of the gradient magnitudes in a block of pixels in an image. FIG. 6, discussed in detail below, describes various techniques for collecting image statistics such as the dominant gradient orientation and the peak and the sum of gradient magnitudes. Color statistics, such as color saturation and hue angles, may also be collected for the image.

Collected statistics may be utilized by firmware or other type of controller for the image signal processor to generate a filter strength model that may be used to apply noise filtering to image data. In at least some embodiments, the filter strength model may be generated at the controller by estimating different ratios to determine the amount of texture in a portion of the image with respect to a noise standard deviation. For example, a ratio of the gradient magnitudes collected may be determined with respect to the noise standard deviation for the image. A ratio of the gradient magnitudes with respect to peak gradient magnitudes may also be determined. Based on these ratios, a standard deviation gain map may be determined, which indicates the portions of the image with greater or lesser texture which may correspond to portions with greater or lesser filtering strength. The firmware may program a lookup table (or other structure accessible by the ISP) according to the standard deviation gain map to map filtering strengths to different portions of the image. Other collected statistics for the image data may also be utilized to program the filter model. For example, the color statistics mentioned above, such as color saturation and hue angles, may be analyzed to program the filter strength model to increase or decrease filtering strength based on portions of the image with particular hues.

As indicated at 520, image data for the image may be received at a noise filter of the image signal processor. The image data may be encoded in various formats, including a full color encoding such as a luminance-chrominance encoding (YCbCr). As indicated at 530, filter strength may be determined for the image data according to the filter strength model. For example, a pixel of an image may be received at the noise filter for processing. The location of the pixel within the image may be identified and a corresponding filter strength determined in the filter strength model for the identified location. As indicated at 540, a noise filtering technique may be applied to the image data according to the determined filter strength, in various embodiments. For example, the filter strength may be represented as a gain value to be applied to a standard deviation used to filter the pixel, as discussed below with regard to FIG. 7. Numerous different filtering techniques may be applied, including bi-lateral filtering, non-local means filtering, or other linear or non-linear filtering techniques.

As noted above, noise statistics may be collected for an image in order to provide information to dynamically generate a filter strength model for noise filtering image data. FIG. 6 is a high-level flowchart illustrating various methods and techniques for generating noise statistics for an image, according to some embodiments. In at least some embodiments, noise statistics may be accumulated for different portions of an image. Non-overlapping blocks of pixels of the image may be selected, as indicated at 610, for evaluation. In at least some embodiments, block size may be determined or directed by an ISP controller (e.g., via central control module 320). Horizontal and vertical directions of a block's size may be set independently. Partial blocks may not be utilized to collect image statistics.

As indicated at 620, spatial gradients may be calculated for the block, in some embodiments. For example, spatial gradients may be computed for each color channel of a full color encoding (e.g., for Y, Cb, and Cr). For instance, in a 3×3 pixel block, spatial gradients may be determined with respect to a center pixel so that each directional line including the center pixel (e.g., vertical, horizontal, and 2 diagonals) may have corresponding spatial gradients calculated (e.g., by determining the different between the outer pixels in the directional line). When computing a spatial gradient, the pixel values may be bit-shifted (with rounding) by a pre-defined amount. Rounding may be performed with sign such that spatial gradient values are rounded up if positive and rounded down if negative. Spatial gradients may also be scaled in some scenarios (e.g., when image data has been scaled up for processing).

As indicated at 630, dominant gradient orientations and a peak of gradient magnitude may be determined for the block according to the spatial gradients, in some embodiments. Dominant gradient orientations may be computed as a histogram. Each bin in the histogram may correspond to maximal gradient values for the different directions of the spatial gradients (e.g., horizontal, vertical, and 2 diagonals). The maximal gradient bins may be incremented according to the maximal gradient for each pixel in the block. If the spatial gradients for a pixel are tied, then the bins may be incremented fractionally according to the number of tied gradients. A peak and sum of the gradient magnitude are also determined based on the gradient values. As indicated at 640, a sum of the pixel intensities in the block may be calculated. In some embodiments if the sum of pixel intensities is negative, then the sum may be clipped to zero.

As indicated at 650, the histogram of the dominant gradient orientations, the peak and sum of the gradient magnitude, and the sum of pixel intensities may be stored as part of noise statistics for the block in a memory. Various different formats and structures for storing the noise statistics may be implemented. For instance, noise statistics may be written to the memory in scan order. If other blocks remain to be evaluated, then as indicated by the positive exit from 660, the technique may be repeated, starting again at element 610.

Figure 7:
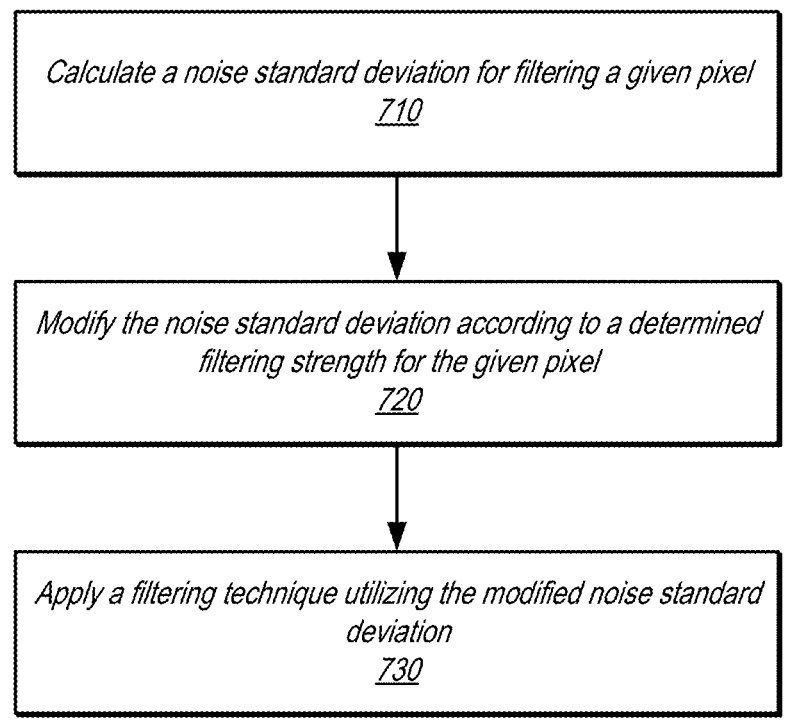
FIG. 7 is a high-level flowchart illustrating various methods and techniques for applying a noise filtering technique utilizing a dynamically determined filtering strength, according to some embodiments.

FIG. 7 is a high-level flowchart illustrating various methods and techniques for applying a noise filtering technique utilizing a dynamically determined filtering strength, according to some embodiments. Different spatial filtering techniques may utilize a standard deviation to determine whether a particular pixel should be filtered. As indicated at 710, a noise standard deviation may be determined for filtering a given pixel. The standard deviation may be determined in many ways. For example, the noise standard deviation may be specified as a function of a given pixel. The noise standard deviation may change with pixel intensities and not remain a constant throughout the image. A lookup table or other accessible structure may be utilized to determine the noise standard deviation for a given pixel (e.g., interpolating the noise standard deviation with respect to the luminance value of the given pixel). In some embodiments, the noise standard deviation may be separate for different color channels of a pixel and may be separately determined for the different color channels (e.g., standard deviation for luminance image data may be different than the standard deviation for chrominance image data).

As indicated at 720, the noise standard deviation may be modified according to the determined filtering strength for the given pixel. For instance, the filtering strength may be represented as a gain to be applied to the noise standard deviation. The filtering strength may be identified, as discussed in FIG. 5, by accessing a filter strength model that maps gains to different locations of an image, such as in a 2D lookup table. Thus, the filtering strength may be a gain value interpolated from the 2D lookup table according to the location of the given pixel that is applied to the noise standard deviation.

As indicated at 730, a filtering technique may then utilize the modified noise standard deviation for filtering. For instance, if the filtering technique examines difference between a given pixel and a neighborhood of pixels including the given pixel (e.g., as in a bilateral filtering technique) and compares the difference value to a noise standard deviation, the noise standard deviation utilized may be the modified noise standard deviation for the given pixel. Please note that example filtering technique's utilization of the modified noise standard deviation is merely an example of how a filtering technique may utilize modified noise standard deviation and is not intended to be limiting as to the various other ways in which modified noise standard deviations may be utilized for noise filtering. Different filtering techniques may be applied to different color channels of image data in a full color encoding, in some embodiments. In at least some embodiments, the filter strength applied to the different color channels may be the same.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
a memory; and
an image signal processor comprising a statistics collection unit and a noise filter, the image signal processor configured to:
  collect, by the statistics collection unit, a plurality of statistics for an image comprising pixel values for a plurality of locations, wherein the pixel values indicate respective colors of pixels at the plurality of locations;
  store a filter strength model to the memory that maps respective filtering strengths to different portions of the image based on the plurality of collected statistics;
  receive, at the noise filter, image data for the image; and
  filter the image data to generate filtered image data according to respective filter strengths for different portions of the image data determined according to the filter strength model accessed from the memory.

2. The apparatus of claim 1, wherein:
the statistics collection unit is configured to store the plurality of statistics to the memory; and
the apparatus further comprises a controller for the image signal processor, the controller configured to:
  access the plurality of statistics in the memory;
  generate the filter strength model; and
  store the filter strength model to the memory.

3. The apparatus of claim 2, wherein to generate the filter strength model, the controller is configured to calculate a standard deviation gain map for the image.

4. The apparatus of claim 3:
wherein the image data comprises a pixel in the image;
wherein to determine a filter strength of the respective filter strengths, the image signal processor is configured to interpolate a gain value according to a location of the pixel in the image corresponding to a location in the standard deviation gain map; and wherein to filter the image data to generate filtered image data, the image signal processor is configured to apply the gain value to a noise standard deviation value that is utilized to filter the pixel.

5. The apparatus of claim 1:
wherein the image data is received in a full color encoding that comprises a plurality of color channels; and
wherein to filter the image data to generate filtered image data the image signal processor is configured to apply a filtering technique to one of the color channels and apply a different filtering technique to another one of the color channels.

6. The apparatus of claim 5, wherein the full color encoding is a YCbCr encoding.

7. The apparatus of claim 1, wherein the apparatus comprises a mobile computing device.

8. A method, comprising:
collecting, by an image signal processor, a plurality of statistics for an image comprising pixel values for a plurality of locations, wherein the pixel values indicate respective colors of pixels at the plurality of locations;
storing to a memory, by the image signal processor, a filter strength model that maps respective filtering strengths to different portions of the image based on the plurality of collected statistics;
receiving, at a noise filter for the image signal processor, image data for the image; and
filtering, at the noise filter, the image data to generate filtered image data according to respective filter strengths for different portions of the image data determined according to the filter strength model accessed from the memory.

9. The method of claim 8, further comprising collecting, at the image signal processor, a plurality of noise statistics as the plurality of statistics.

10. The method of claim 9, wherein collecting the plurality of noise statistics comprises:
for one or more non-overlapping blocks of pixels in the image:
calculating spatial gradients for the one or more non-overlapping blocks;
based on the spatial gradients, determining:
dominant gradient orientations for the one or more non-overlapping blocks;
peaks of gradient magnitude for the one or more non-overlapping blocks; and
sums of gradient magnitude for the one or more non-overlapping blocks; and
calculating sums of pixel intensities for the one or more non-overlapping blocks.

11. The method of claim 10, wherein generating the filter strength model comprises generating a standard deviation gain map based on the dominant gradient orientations, the peaks of gradient magnitude, the sums of gradient magnitude, and the sums of pixel intensities for the one or more non-overlapping blocks.

12. The method of claim 8, wherein the plurality of statistics comprise color statistics, and wherein generating the filter strength model comprises mapping the respective filtering strengths according to one or more hues present in the image.

13. The method of claim 8, wherein the filter strength model is a two-dimensional lookup table, and wherein determining the filter strength for the image data comprises:
identifying a corresponding location of the image data in the two-dimensional lookup table; and
interpolating the filter strength with respect to the corresponding location in the two-dimensional lookup table.

14. The method of claim 8, wherein the image signal processor is implemented as part of a mobile computing device.

15. A system, comprising:
a device configured to perform image processing, the device comprising:
an image processing pipeline configured to filter image data of an image received at a noise filter, wherein the image data comprises pixel values for a plurality of locations, and wherein the pixel values indicate respective colors of pixels at the plurality of locations; and
a controller for the image processing pipeline configured to store, to a memory, a filter strength model that maps respective filtering strengths to different portions of the image based on a plurality of statistics collected for the image by the image processing pipeline;
wherein the noise filter is configured to filter the image data according to respective filter strengths for different portions of the image data determined according to the filter strength model accessed from the memory.

16. The system of claim 15, wherein the plurality of statistics comprise dominant gradient orientations, peaks of gradient magnitude, sums of gradient magnitude, or sums of pixel intensities for one or more non-overlapping blocks.

17. The system of claim 16, wherein to store the filter strength model, the controller is configured to generate the filter strength model using a standard deviation gain map.

18. The system of claim 16, wherein at least one of the respective filter strengths is a gain value, and wherein to filter the image data the image processing pipeline is configured to apply the gain value to a noise standard deviation utilized to filter the image data.

19. The system of claim 15, wherein, to filter the image data, the noise filter is configured to apply a filtering technique selected from a plurality of filtering techniques that the image processing pipeline is capable of applying to the image data.

20. The system of claim 15, wherein the system is a mobile computing device.

* * * * *